(12) United States Patent
Balko et al.

(10) Patent No.: US 11,763,851 B2
(45) Date of Patent: *Sep. 19, 2023

(54) CHANGE-DEPENDENT PRE-EXPORT FOR VIDEO EDITING PROJECTS

(71) Applicant: Microsoft Technology Licensing, LLC, Redmond, WA (US)

(72) Inventors: Soeren Balko, Brisbane (AU); Jasmine Mae Minter, Kelvin Grove (AU)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/957,949

(22) Filed: Sep. 30, 2022

(65) Prior Publication Data

US 2023/0215470 A1 Jul. 6, 2023

Related U.S. Application Data

(63) Continuation of application No. 17/565,917, filed on Dec. 30, 2021, now Pat. No. 11,495,265.

(51) Int. Cl.
*G11B 27/034* (2006.01)
*G11B 27/34* (2006.01)
*G11B 27/36* (2006.01)
*G11B 27/036* (2006.01)

(52) U.S. Cl.
CPC .......... *G11B 27/034* (2013.01); *G11B 27/036* (2013.01); *G11B 27/34* (2013.01); *G11B 27/36* (2013.01)

(58) Field of Classification Search
CPC ..... G11B 27/034; G11B 27/036; G11B 27/34; G11B 27/36
See application file for complete search history.

(56) References Cited

U.S. PATENT DOCUMENTS

2010/0119204 A1* 5/2010 Yamasaki ............ G11B 27/034
386/E5.028
2011/0026898 A1 2/2011 Lussier et al.
(Continued)

FOREIGN PATENT DOCUMENTS

WO WO 2008/129782 10/2008

OTHER PUBLICATIONS

International Search Report and Written Opinion Issued in PCT Application No. PCT/US22/045958, dated Jan. 30, 2023, 11 Pages.

*Primary Examiner* — Hung Q Dang
*Assistant Examiner* — Jose M Mesa
(74) *Attorney, Agent, or Firm* — Klarquist Sparkman, LLP

(57) ABSTRACT

Techniques are described for pre-exporting chunks of video content during video editing of a video editing project. For example, the chunks of the video editing project can be monitored for changes. When a change is detected to a chunk, the chunk can be pre-exported as an independent chunk that is combinable with other pre-exported chunks and without encoding or re-encoding the pre-exported chunks. In addition, the monitoring and pre-exporting can be performed while the video editing project is editable by a user of the video editing project. When the video editing project is ready to be finalized, the pre-exported chunks can be combined to generate, at least in part, a media file. The generated media file can then be output.

20 Claims, 8 Drawing Sheets

(56) References Cited

U.S. PATENT DOCUMENTS

| | | | | |
|---|---|---|---|---|
| 2012/0207452 A1* | 8/2012 | Wang | ............... | G11B 27/034 |
| | | | | 386/E5.028 |
| 2012/0321280 A1* | 12/2012 | Lin | ............... | G11B 27/031 |
| | | | | 348/E9.011 |
| 2013/0121668 A1* | 5/2013 | Meaney | ............... | H04N 5/262 |
| | | | | 386/282 |

\* cited by examiner

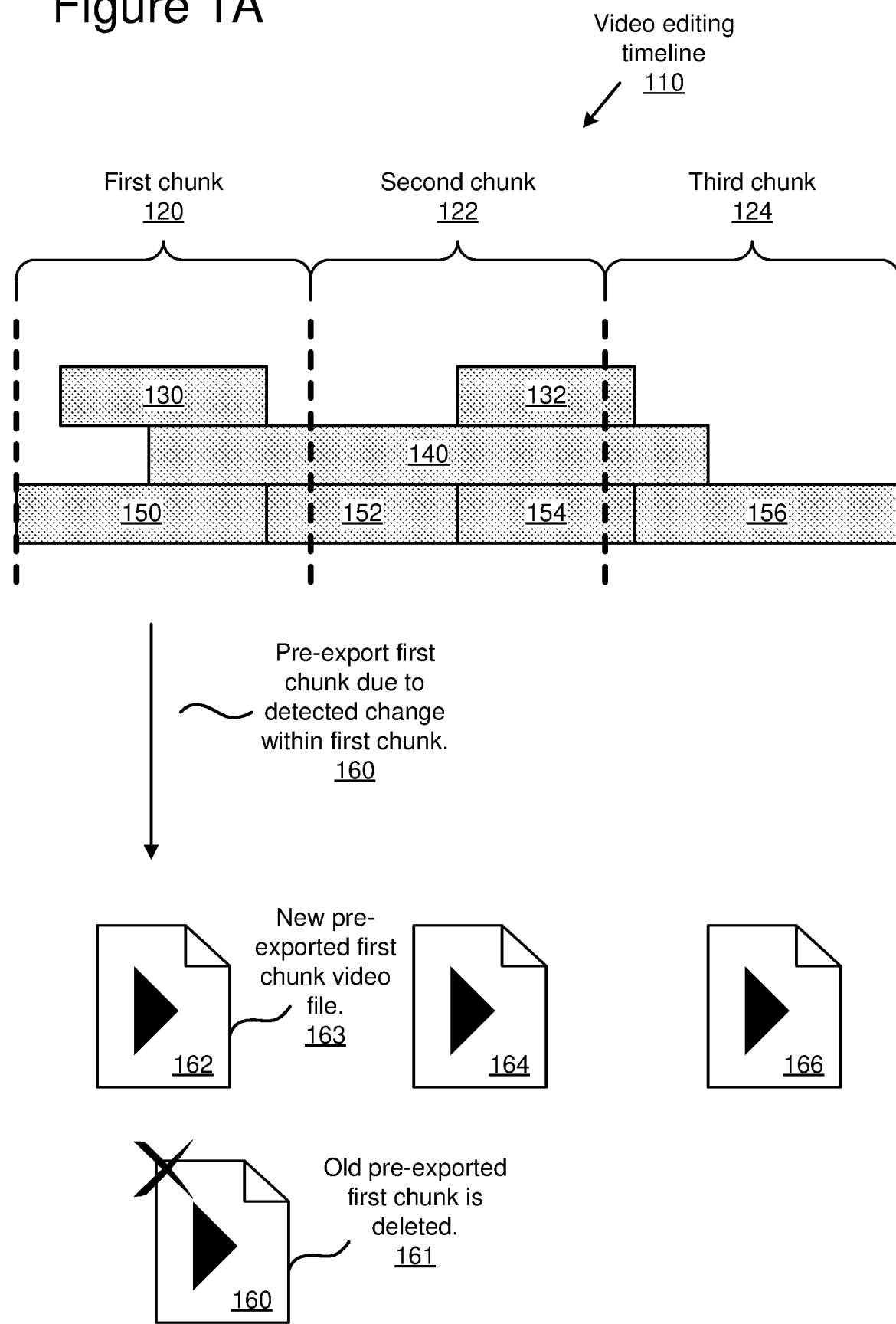

Video editing project is finalized. 182

SOFTWARE 580 IMPLEMENTING DESCRIBED TECHNOLOGIES

CHANGE-DEPENDENT PRE-EXPORT FOR VIDEO EDITING PROJECTS

CROSS REFERENCE TO RELATED APPLICATIONS

This is a continuation of U.S. patent application Ser. No. 17/565,917, filed Dec. 30, 2021, which is hereby incorporated by reference.

BACKGROUND

Video editing can be a time consuming and cumbersome process. With a typical video editing solution, the user creates a video projects and adds various elements, such as video elements, audio elements, effects, etc. The user then edits the elements as needed (e.g., adjusting video clip locations and runtimes, configuring effects and transitions, etc.). When the user has finished editing the video editing project, the user exports the video editing project.

When exporting the video editing project, the user typically experiences long wait times (e.g., a number of minutes or hours). Such long wait times are caused by the compute resource intensive task of combining and encoding the elements of the video editing project. Such long wait times are detrimental to the user experience of using a video editing software application.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for pre-exporting chunks of video content during video editing of a video editing project. For example, operations can be performed for each of a plurality of chunks of video content for the video editing project, where each chunk covers a different interval of a video editing timeline for the video editing project. The operations can comprise determining whether the chunk of video content has changed since a last time the chunk of video content was pre-exported. When the chunk of video content has changed, the chunk of video content is pre-exported. The pre-exporting is performed while the video editing project is editable by a user and before the video editing project is finalized. Furthermore, the pre-exported chunk of video content is independent of other pre-exported chunks of video content for the video editing project and can be combined with the other pre-exported chunks of video content without encoding or re-encoding the pre-exported chunks.

As another example, technologies are described for pre-exporting chunks of video content during video editing of a video editing project. In a pre-export phase, a number of operations are performed. According to a first operation of the pre-export phase, monitoring is performed for each of a plurality of chunks of video content for the video editing project for changes, where each chunk covers a different interval of a video editing timeline for the video editing project. According to a second operation of the pre-export phase, when a change to a chunk of video content is detected, the chunk of video content is pre-exported, where the pre-exported chunk of video content is independent of other pre-exported chunks of video content for the video editing project. During the pre-export phase, the plurality of chunks of video content are monitored while the video editing project is editable by a user and before the video editing project is finalized and exported as a media file. In a finalization phase, a number of operations are performed. According to a first operation of the finalization phase, the pre-exported chunks of video content from the pre-export phase are combined to generate, at least in part, a media file, where the combining is performed without encoding or re-encoding the pre-exported chunks of video content. According to a second operation of the finalization phase, the generated media file is output.

BRIEF DESCRIPTION OF THE DRAWINGS

FIG. 1A is a diagram depicting an example video editing timeline which is used to illustrate pre-exporting chunks of video content according to a first scenario.

DETAILED DESCRIPTION

Overview

Figure 1B:
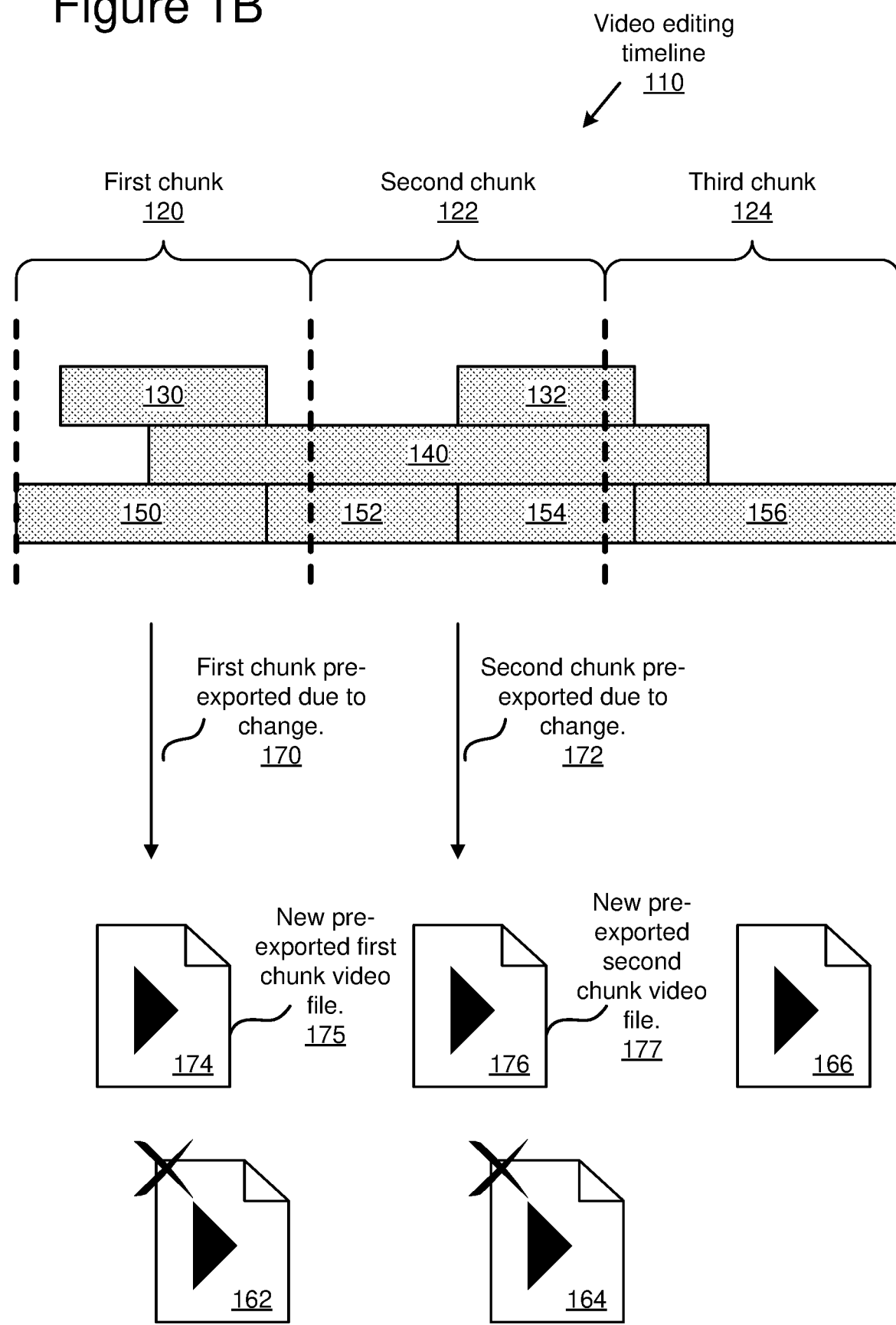
FIG. 1B is a diagram depicting the example video editing timeline which is used to illustrate pre-exporting chunks of video content according to a second scenario

The following description is directed to technologies for pre-exporting chunks of video content during video editing of a video editing project. For example, the chunks of the video editing project can be monitored for changes. When a change is detected to a chunk, the chunk can be pre-exported as an independent chunk that is combinable with other pre-exported chunks and without encoding or re-encoding the pre-exported chunks. In addition, the monitoring and pre-exporting can be performed while the video editing project is editable by a user of the video editing project. When the video editing project is ready to be finalized, the pre-exported chunks can be combined to generate, at least in part, a media file. The generated media file can then be output.

Example Video Editing

The technologies described herein are implemented in the context of video editing. Video editing refers to the process of combining various video editing elements, including media assets (e.g., video content, images, audio files, etc.), effects (e.g., filters, transitions, distortions, etc.), different types of synthetic content (e.g., motion titles, animations, etc.), and/or other elements to create a single continuous video file. In a typical video editing scenario, a user uses video editing software to creatively select and insert these elements into a video editing project. The video editing project represents the eventual output video in a temporal manner (e.g., using a timeline defining when different elements appear) and a spatial manner (e.g., locations where certain video elements will be shown in the video's dimensions). Users typically iterate over applying, inspecting, and refining video editing operations, such as to place a specific media asset at a particular time offset, to trim the specific media asset to a desired length, to apply an effect on top of the specific media asset, etc.

Video editing is performed using video editing software on a computing device (e.g., a desktop or laptop computer, a tablet, a smart phone, or another type of computing device). The video editing software can be a video editing software package or app that is installed on the computing device, a browser-based video editor application that runs in a web browser, a cloud-based video editing service, or another type of video editing software solution.

The user often spends a substantial amount of time (e.g., minutes, hours, or even days) editing their video editing project until the video editing project is complete and ready to be finalized and exported. However, while a user may spend a lot of time during the video editing process, the process typically has a low impact on computing resource utilization. For example, the user may perform video editing operations (e.g., moving or trimming a video clip, adding a title or transition, etc.) that do not require significant computing resources (e.g., CPU utilization, GPU utilization, memory and storage I/O, etc.) and that are only performed occasionally (e.g., the user may spend seconds or minutes between performing such video editing operations). As a result, during the video editing process, the computing device running the video editing software can be mostly idle.

When using traditional video editing software, it is not until the video editing project is exported (e.g., exported as a single continuous media file, such as an MP4 file) that substantial computing resources and time are required. Specifically, the export process with traditional video editing software is a non-interactive process in which the video editing project is exported while the user waits. Export times are driven by a number of project properties, such as the resolution and duration of the video content, the effects that are applied, the specific video codec and settings that are used during encoding, and the available computing resources, in addition to other factors. As a result, exporting the video editing project can take minutes, hours, or more. Such long export times can be frustrating to the user. For example, the user's computer may run slowly for the duration of the export process, and the user will not be able to perform any video editing operations on their project until the export process has finished or is aborted.

The technologies described herein provide various advantages and improvements when compared to traditional video editing solutions. In one aspect, the video editing project is divided into a number of intervals (referred to as chunks), which are then monitored for changes during the video editing process. When a change is detected for a given chunk, the chunk is pre-exported. By pre-exporting chunks when changes are detected, the user can continue the video editing process uninterrupted. For example, chunks can be pre-exported at idle times during the video editing process. A computer is idle when all running applications combined do not exhaust the full amount of available hardware resources at this time. Idle times can be detected and reported by operating systems and exposed through suitable application programming interfaces (APIs). Chunks can also be pre-exported in the background while allowing the user to continue to make changes to the video editing project (e.g., pre-exporting chunks is a non-blocking operation, which means that the user is not prevented from continuing to perform video editing operations on the video editing project while it is being pre-exported). In another aspect, a process (e.g., a background process) can periodically (e.g., continuously or on another periodic basis) monitor the chunks (e.g., in a round-robin fashion) for changes and when a change is detected to a given chunk, the given chunk can be pre-exported. In this way, pre-exported chunks are generated while the user can perform video editing operations. This helps to ensure that the pre-exported chunks are up-to-date (i.e., the chunks has not changed since it was last pre-exported) when the finalization process is initiated.

In another aspect, when the video editing project is finalized, the pre-exported chunks can be combined in an efficient manner, and without performing any encoding or re-encoding of the pre-exported chunks. For example, instead of the traditional video editing solution where the user waits while the video editing project is exported, the technology described herein can efficiently combine the pre-exported chunks when finalizing the video editing project and generating an output media file in much less time and using fewer computing resources (e.g., CPU and memory resources). In some implementations, the pre-exported chunks (e.g., the chunk video files) are merely concatenated together when the video editing project is finalized, and the output media file is generated.

Terminology

The term "chunk" (also called a chunk of video content) refers to an interval (also referred to as a time interval) of a video editing timeline for a video editing project. In general, the video editing timeline is divided into a number of adjacent intervals. Each of the intervals is associated with a different time range of the video editing timeline. In some implementations, the video editing timeline is divided into chunks having the same length (or the same amount of time), such as 30 seconds. For example, a five-minute video editing timeline could be divided into ten chunks (adjacent and non-overlapping), each having a length of 30 seconds. In other implementations, chunks may have different, or mixed, lengths.

The term "video editing timeline" refers to the timeline used by video editing software. The timeline indicates the various elements (e.g., media assets, effects, etc.) that make up the video editing project, along with their various properties (e.g., start offset, duration, effect type, settings, etc.).

The term "video editing project" refers to a project for organizing video editing elements (also referred to as just elements) using a video editing timeline within video editing software. The video editing project typically uses a graphical computer user interface to display the video editing timeline and allow the user to edit the elements of the timeline. However, the video editing software can also use a non-graphical user interface (e.g., a text-based user interface) or be implemented, at least in part, in an automated fashion (e.g., a machine learning approach to turn a collection of media into a video). Ultimately, the video editing project is finalized, and an encoded media file (e.g., an MP4 file) is output.

The term "pre-exporting" refers to an operation where a chunk of video content is exported while the video editing project can be edited by the user before the video editing project is finalized (where a final export is performed and a media file is created for the video editing project using, at least in part, the pre-exported chunks). In other words, pre-exporting occurs in parallel to video editing operations being performed (e.g., by the user) and before the video editing project is exported (e.g., before the user decides to export their project). For example, pre-exporting can occur during idle times or on a periodic based when a change is detected to a chunk.

Example Pre-Exporting Chunks of a Video Editing Project

In the technologies described herein, chunks of a video editing project can be pre-exported when changes are detected and while video editing is ongoing. When the video editing project is ultimately finalized, the pre-exported chunks can be combined in an efficient manner, and without encoding or re-encoding, to generate and export a media file for the video editing project.

FIG. 1A is a diagram depicting an example video editing timeline 110 which is used to illustrate pre-exporting chunks of video content according to a first scenario. The example video editing timeline 110 is associated with a video editing project that runs within video editing software. The example video editing timeline 110 is comprised of a number of tracks, with each track containing various video editing elements. In this example, there are three tracks, but in general a video editing timeline can be comprised of any number of tracks (i.e., one or more tracks).

In the example video editing timeline 110, the first track contains two video editing elements, which are labeled 130 and 132. For example, video editing elements 130 and 132 could be title overlays or other effects. The second track contains one video editing element, which is labeled 140. For example, video editing element 140 could be video content (e.g., the entire content of a video file or a portion of a video file), such as video of a person that is narrating a video game walkthrough. The third track contains four video editing elements, which are labeled 150, 152, 154, and 156. For example, video editing elements 150, 152, 154, and 156 could be video from one or more video files (e.g., video editing element 150 could be a video clip with a specific start and stop time from a first video file, video editing element 152 could be a video clip with a specific start and stop time from a second video file, video editing element 154 could be a video clip also from the first video file but with a different start and stop time, and video editing element 156 could be a video clip from a third video file). Other tracks can also be present in the video editing timeline 110. For example, there can be tracks containing other types of visual content and/or tracks containing audio content.

The example video editing timeline 110 is divided into a number of chunks of video content. In this example, the video editing timeline 110 is divided into three chunks: a first chunk 120, a second chunk 122, and a third chunk 124. Each chunk covers a different interval of the video editing timeline 110. In this example, the first chunk 120 covers a first interval of the video editing timeline 110 (e.g., the first 30 seconds, or time interval 0-30 seconds), the second chunk 122 covers a second interval of the video editing timeline 110 (e.g., the next 30 seconds, or time interval 31-60 seconds) and is adjacent to the first chunk 120, and the third chunk 124 covers a third interval of the video editing timeline 110 (e.g., the next 30 seconds, or time interval 61-90 seconds), and is adjacent to the second chunk 122. In this example, the chunks are each 30 seconds in length, but in other implementations the chunks could have a different length (e.g., a different fixed or pre-determined length) or be of mixed lengths. In general, dividing the timeline into chunks happens in a configurable manner (e.g., with a configurable chunk time interval) and is transparent to the user (e.g., it is performed automatically by the video editing software).

As depicted in the example video editing timeline 110, a given chunk covers the tracks of the video editing timeline 110 for a given range (e.g., a range defined by a time interval, such as 0-30 seconds, or a range defined in another manner, such as range of video frames). Also, as depicted, a given video editing element may be contained within one chunk or it may span multiple chunks. For example, video editing element 130 is within the first chunk 120, while video editing element 140 spans all three chunks (and as a result, it is within, or overlaps, all three chunks).

As depicted in FIG. 1A, when the first video editing scenario begins, each of the video chunks has a corresponding pre-exported chunk video file. In other words, the first video editing scenario begins after the user has already started editing the video editing project (e.g., added the video editing elements) and pre-exporting has been ongoing. Specifically, the first chunk 120 has pre-exported chunk video file 160, the second chunk 122 has pre-exported chunk video file 164, and the third chunk has pre-exported chunk video file 166. Continuing with the first video editing scenario, the user has edited video editing element 130. For example, the user could have added video editing element 130 to the first track or modified existing video editing element 130 (e.g., changed the title text, location, or duration of the element).

Upon detecting that there has been a change to the first chunk 120 (e.g., adding, modifying, and/or deleting any of the video editing elements within the first chunk 120), the first chunk 120 is pre-exported, as depicted at 160. For example, the change could be detected by comparing properties of the video editing elements within the first chunk 120 to properties associated with a last pre-export of the first chunk 120 (in this example, the last pre-export of the first chunk 120 is chunk video file 160). Pre-exporting the first chunk 120 involves various video processing operations, such as video decoding (e.g., to obtain raw video content), combining elements (e.g., compositing, combining multiple video streams, etc.), video encoding, and/or other video processing operations. The new pre-exported first chunk of video content is saved as a chunk video file 162, as indicated at 163. The pre-exported chunk video file 162 contains an encoded video representation of the video editing elements from the first chunk 120. In some implementations, the current (now old) chunk video file 160 is deleted, as depicted at 161 (i.e., it is replaced with the new pre-exported chunk video file 162). However, in other implementations, the current (now old) chunk video file 160 can be retained (e.g., to allow access to previous versions of the video editing project).

FIG. 1B is a diagram depicting the example video editing timeline 110 which is used to illustrate pre-exporting chunks of video content according to a second scenario that occurs after the first scenario. When the second scenario begins, the current pre-exported chunk video files for the three chunks are 162, 164, and 166. Continuing with the second scenario, the user edits video editing element 152. Because video editing element 152 is part of both the first chunk 120 an the second chunk 122, it results in a change to both the first chunk 120 and the second chunk 122 (but not the third chunk 124).

Upon detecting that there has been a change to the first chunk 120 (in this scenario, the change to video editing element 152), the first chunk 120 is pre-exported, as depicted at 170. This will replace the last pre-exported chunk video file 162 for the first chunk 120 with a new pre-exported first chunk video file 174, as depicted at 175. Similarly, Upon detecting that there has been a change to the second chunk 122 (in this scenario, the change to video editing element 152), the second chunk 122 is pre-exported, as depicted at 172. This will replace the last pre-exported chunk video file 164 for the second chunk 122 with a new pre-exported second chunk video file 176, as depicted at 177. Detecting the change to the first chunk 120 and the second chunk 122 could be performed serially (e.g., by a background process that sequentially scans through the chunks for changes) or based on a trigger (e.g., by detecting when a user performs a change to an element within a chunk, such as by maintaining a change log of video editing operations).

In general, the video editing process can be divided into a pre-export phase and a finalization phase. The pre-export phase occurs while the video editing project is active (e.g., it is open in the video editing software) and while the user can perform video editing operations, and before the video editing project is finalized. During the pre-export phase, the chunks of video content are checked for changes and pre-exported when changes are detected. In some implementations, the chunks are monitored using a process (e.g., a background process) that checks the chunks for changes since they were last pre-exported. For example, the process can continuously monitor the chunks of the video editing process (e.g., using a round-robin approach to continuously iterate over the chunks of the video editing project). The process can also monitor the chunks on another periodic basis (e.g., check the chunks every number of seconds or minutes). In some implementations, pre-exporting is triggered based on a change. For example, when the user performs a video editing operation that causes a change to one or more chunks, pre-exporting can be triggered for the affected one or more chunks.

There are various ways to detect whether there has been a change to a chunk since a last time the chunk was pre-exported. In some implementations, the properties of the chunk are compared to properties associated with the last time the chunk was pre-exported. The properties of a given chunk are the properties of the video editing elements within the given chunk (e.g., the properties of all video editing elements that overlap with the chunk and that completely describe the video editing elements such that they can be identically re-constructed using the properties) and/or the properties otherwise associated with the given chunk (e.g., global properties of the video editing project that affect the given chunk). For example, if the chunk includes a video clip, some properties could be the identity (e.g., file or video clip name), start location (e.g., time code or frame number), and length (e.g., length of time or number of frames) of the video clip. As another example, if the video editing element is an effect, the properties could include an indication of the particular effect (e.g., whether it is a fade in, a fade out, etc.), an indication of when the effect starts (e.g., an offset or time location), an indication of the duration (e.g., a number of seconds), etc. As another example, if the video editing element is a title overlay, the properties could include text properties (e.g., font properties), color properties (e.g., background color), start location and duration properties, etc.

In some implementations, a text representation (e.g., a string representation) is generated for the properties of the chunk. For example, a string representation can be generated in a JSON format or in another text format. To determine whether a given chunk has changed, the text representation of the properties of the chunk can then be compared to a text representation of the properties of the chunk from the last time the chunk was pre-exported (e.g., the text representation of the properties from the last time the chunk was pre-exported can be stored and obtained when the chunk is checked by a process monitoring the chunks). If there is any difference, then a determination can be made that the given chunk has changed and needs to be pre-exported. For example, the comparison would detect a difference when a video editing element is added or deleted from the given chunk since it was last pre-exported (e.g., when a new video clip is added to the video editing project that overlaps with the given chunk) or when an existing video editing element is changed within the given chunk since it was last pre-exported (e.g., when an element's start location on the video editing timeline is changed). The comparison could also detect a difference in global properties that affect the given chunk (e.g., if the resolution or frame rate of the video editing project is changed since the given chunk was last pre-exported). In general, any representation of the properties (e.g., text or binary) can be compared to determine whether a given chunk has changed.

In some implementations, a hash representation is generated from the properties of the chunk. For example, the properties (e.g., in text format or in another format, such as a binary format) for a chunk can be combined and a hash function can be applied to generate a hash value. Various hash algorithms can be used to generate the hash value, such as the SHA-2 hash algorithm. The generated hash value for the current chunk (also referred as the current state of the chunk to indicate that the current properties associated with the chunk are used to generate the hash value) can then be compared to a hash value generated from the properties of the chunk when it was last pre-exported (i.e., the properties associated with the state of the chunk when it was last pre-exported). If the hash values do not match, then there has been a change to the properties of the chunk since the last time it was pre-exported, and a pre-export of the chunk can be initiated. In some implementations, when a chunk is pre-exported, its associated hash value is saved (e.g., to a data store) for use when performing later comparisons.

In some implementations, when a change to a chunk of video content is detected in relation to the last time the chunk of video content was pre-exported, the chunk of video content is pre-exported. If there has been no change to the chunk since the last time it was pre-exported, then the chunk is not pre-exported (e.g., the process checking the chunks proceeds to the next chunk).

In some implementations, a global video editing project change could affect one or more chunks (e.g., all chunks) of the video editing project. For example, a change to a property such as resolution or frame rate could affect all chunks and result in all chunks being pre-exported.

In some implementations, a data store is maintained indicating the state of the chunks of the video editing project. For example, the data store can store information about the video editing project comprising: an identifier for the video editing project, an identifier for each chunk, and an indicator (e.g., the properties themselves, such as in a text format or other format, and/or a hash value) of the state of the chunk from the last time it was pre-exported. The pre-exported chunk itself (the chunk video file) can also be stored in the data store (e.g., as a blob data type) or in other storage (e.g., stored as a file in a file system). In some implementations, the data store is maintained as a database (e.g., using the IndexedDB database or another database system).

Pre-exporting a chunk of video content involves a number of operations. In general, pre-exporting a chunk comprises performing operations similar to those of a traditional video editing project export, but limited to the scope of the chunk. For example, pre-exporting a given chunk can comprise performing video decoding operations (e.g., to obtain raw video content from the video clips within the interval of the chunk), combining various elements such as effects, transitions, and/or other elements (e.g., by performing video compositing and/or processing operations), and encoding the combined video content as a chunk video file (e.g., encoded according to a video coding standard, such as the H.264 video coding standard or another video coding standard).

The pre-exported chunk video file is generated (e.g., encoded) in a format that can be efficiently combined when the video editing project is finalized and without having to encode or re-encode the chunk video file during the finalization phase. In some implementations, the chunk video files are generated and stored using the motion picture expert group (MPEG) transport stream (TS) container format.

Example Finalizing of a Video Editing Project

In the technologies described herein, finalizing a video editing project is performed in an efficient manner that includes combining the pre-exported chunk video files without encoding or re-encoding the pre-exported chunk video files. For example, finalization can be performed by generating an output media file for the video editing project where the output media file comprises the pre-exported chunk video files and other types of media files (e.g., audio files).

Figure 1C:
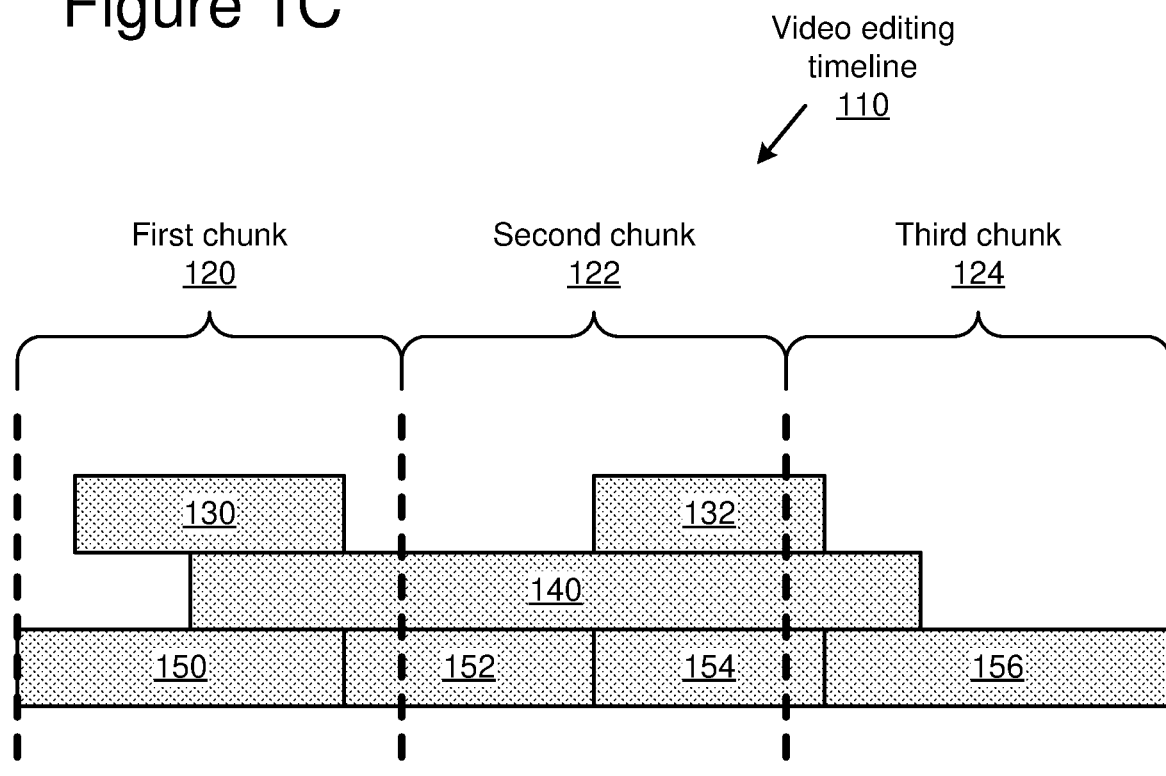
FIG. 1C is a diagram depicting the example video editing timeline which is used to illustrate pre-exporting chunks of video content according to a third scenario.
Figure 1C:
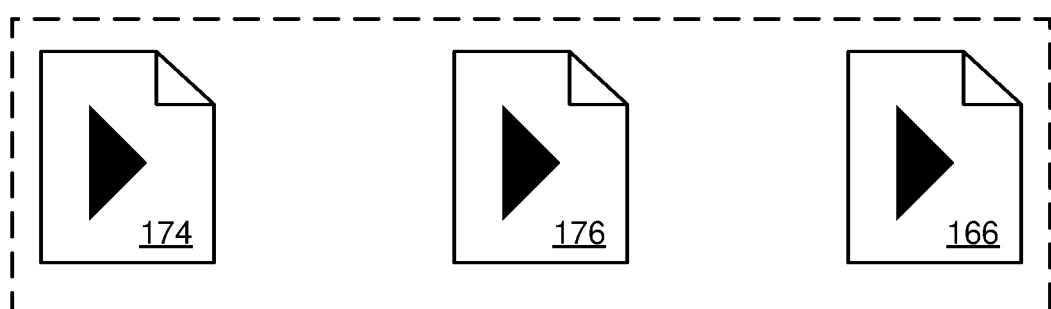
Figure 1C:
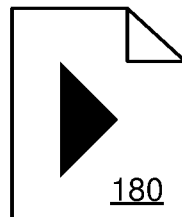

FIG. 1C is a diagram depicting the example video editing timeline 110 which is used to illustrate pre-exporting chunks of video content according to a third scenario that occurs after the second scenario. When the third scenario begins, the current pre-exported chunk video files for the three chunks are 174 (the chunk video file for the first chunk 120), 176 (the chunk video file for the second chunk 122), and 166 (the chunk video file for the third chunk 134). Continuing with the third scenario, the user has decided to finalize the video editing project. When the video editing project is finalized, the pre-exported chunk video files are combined to generate, at least in part, an encoded media file (e.g., a single encoded media file) representing the video editing project (e.g., representing the entire video editing project, or in other words, covering all chunks of the video editing project). Specifically, in the third scenario, pre-exported chunk video files 174, 176, and 166 are combined to generate, at least in part, the encoded media file 180, as depicted at 182. Combining the pre-exported chunk video files 174, 176, and 166 is performed without encoding or re-encoding the pre-exported chunk video files 174, 176, and 166. While the encoded media file 180 includes the encoded video content from the pre-exported chunk video files 174, 176, and 166, it should understood that the encoded media file 180 can also include other media content, such as audio content (e.g., one or more encoded audio tracks), subtitles, etc.

Because the pre-exported chunk video files are encoded and stored in a format that can be combined without encoding or re-encoding the pre-exported chunk video files, the finalization phase can be performed in a more efficient manner, and using fewer computing resources, than would be needed if the video editing project were exported in a traditional manner For example, in some implementations the pre-exported chunk video files are concatenated on a file level, which is as efficient as reading and/or writing a file from and/or to storage of the computing device.

In some implementations, the finalization phase comprises performing a final pass on the chunks of the video editing project to determine if there are any chunks that have changed since they were last exported. For example, there may have been changes made since the last time the chunks were checked or there could be chunks that were never changed and that don't yet have a pre-exported chunk video file. If any such chunks are detected, they can be pre-exported in preparation for finalization of the video editing project.

In some implementations, the pre-exported chunk video files can be decoded. For example, decoding, or partial decoding, of one or more of the pre-exported chunk video files can be performed to generate an index for the media file (e.g., to provide seek points), to obtain header information, etc. However, even in such implementations, the pre-exported chunk video files are not encoded or re-encoded.

Methods for Pre-Exporting Chunks of Video Content during Video Editing

In any of the examples herein, methods can be provided for pre-exporting chunks of video content during video editing of a video editing project. The chunks can be pre-exported while the user is editing the video editing project, and the pre-exported chunks can be later combined without having to encode or re-encode the pre-exported chunks.

Figure 2:
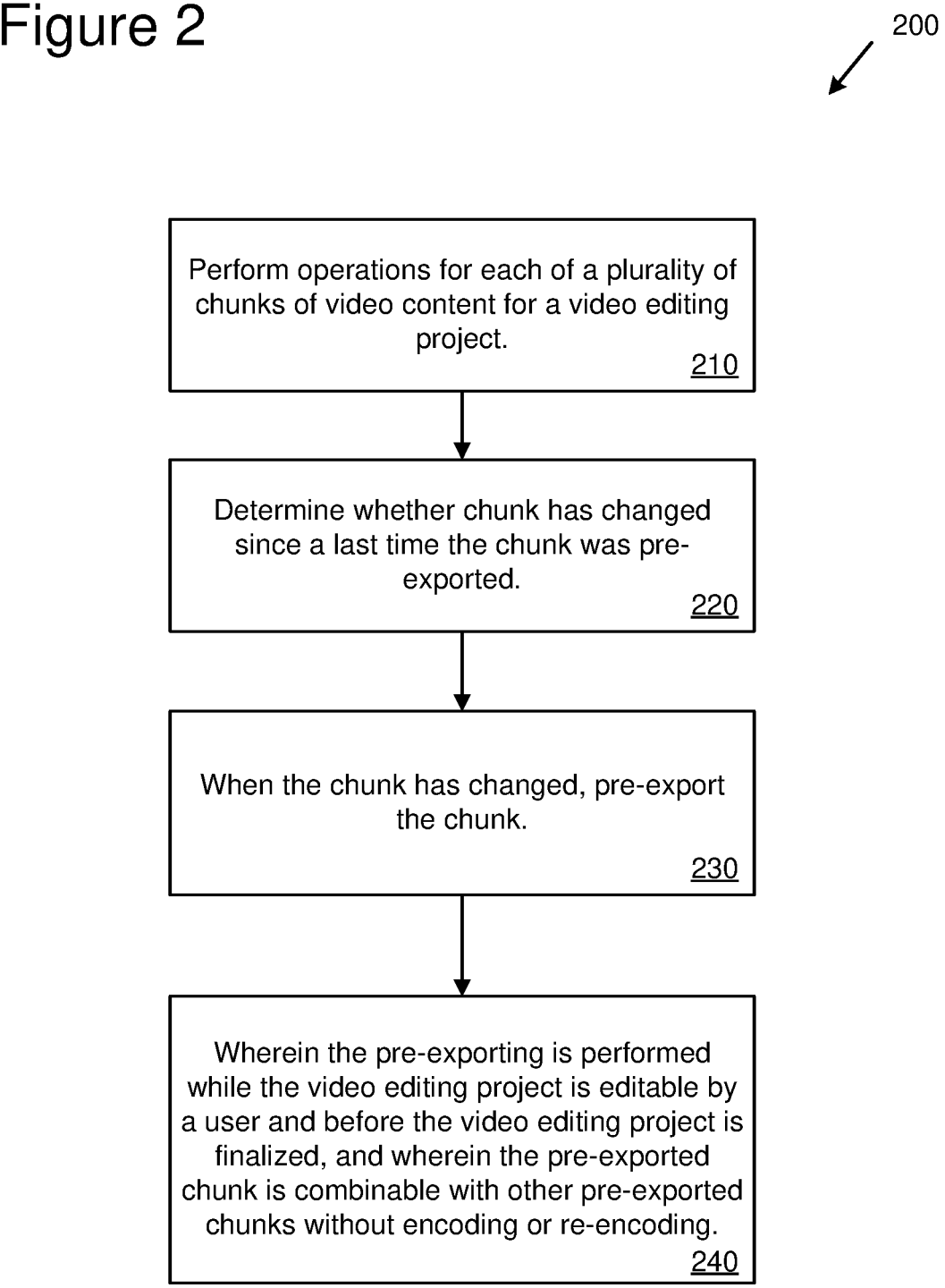
FIG. 2 is a flowchart of an example method for or pre-exporting chunks of video content during video editing of a video editing project.

FIG. 2 is a is a flowchart of an example method 200 for or pre-exporting chunks of video content during video editing of a video editing project. At 210, a number of operations are performed for each of a plurality of chunks of video content for a video editing project. For example, the operations can be performed as part of a pre-exporting phase. Specifically, at 220, the chunk of video content is checked to determine whether it has changed since the last time it was pre-exported. For example, determining whether the chunk has changed can be performed by comparing properties associated with the chunk to properties associated with the last export of the chunk (e.g., comparing properties directly or comparing hash values generated from the properties). At 230, when the chunk has changed, the chunk is pre-exported. The pre-exported chunk is encoded according to a video coding standard. Otherwise, when the chunk has not changed, the pre-exporting operation is skipped (i.e., the chunk is not pre-exported and the previously pre-exported chunk video file is retained without modification). As depicted at 240, the pre-exporting is performed while the video editing project is editable by a user (e.g., the user can continue to use the video editing project and perform video editing operations while the determining and pre-exporting is being performed and without being blocked) and before the video editing project is finalized. In addition, the pre-exported chunk is combinable with other pre-exported chunks (e.g., during a finalization phase) without encoding or re-encoding the pre-exported chunks.

In some implementations, a process (e.g., a background process) monitors the chunks of video content to determine whether they have changed (e.g., performing at least the operation depicted at 220). The process could monitor the chunks on a continuous basis or on a periodic basis. For example, in some implementations, a background process iterates over all of the chunks of the video editing process, checking for changes, and pre-exporting when changes are detected, according to the operations depicted in FIG. 2.

In some implementations, determining whether a chunk has changed, as depicted at 220, is based on receiving an indication that the user has edited something that affects the chunk (e.g., edited a video editing element within the chunk or edited a global property affecting the chunk). For example, when the user performs such an edit, the determining and pre-exporting (as depicted at 220 and 230) can be triggered. In some implementations, triggering of the pre-export is delayed such that the chunk is not pre-exported until the user has finished editing the elements of the chunk. For example, triggering of the pre-export can be performed after a delay interval (e.g., a configurable delay interval) so that the pre-export is triggered once the user has not performed an editing operation on the given chunk for the delay interval.

When the video editing project is finalized and a media file is generated and exported (saved or stored), the pre-exported chunks (that were pre-exported as depicted at 230) are combined without encoding or re-encoding the pre-exported chunks. The generated media file (e.g., a single media file representing the entire video editing project) can comprise other audio and/or video data in addition to the combined pre-exported chunks, such as audio tracks, subtitle content, etc.

Figure 3:
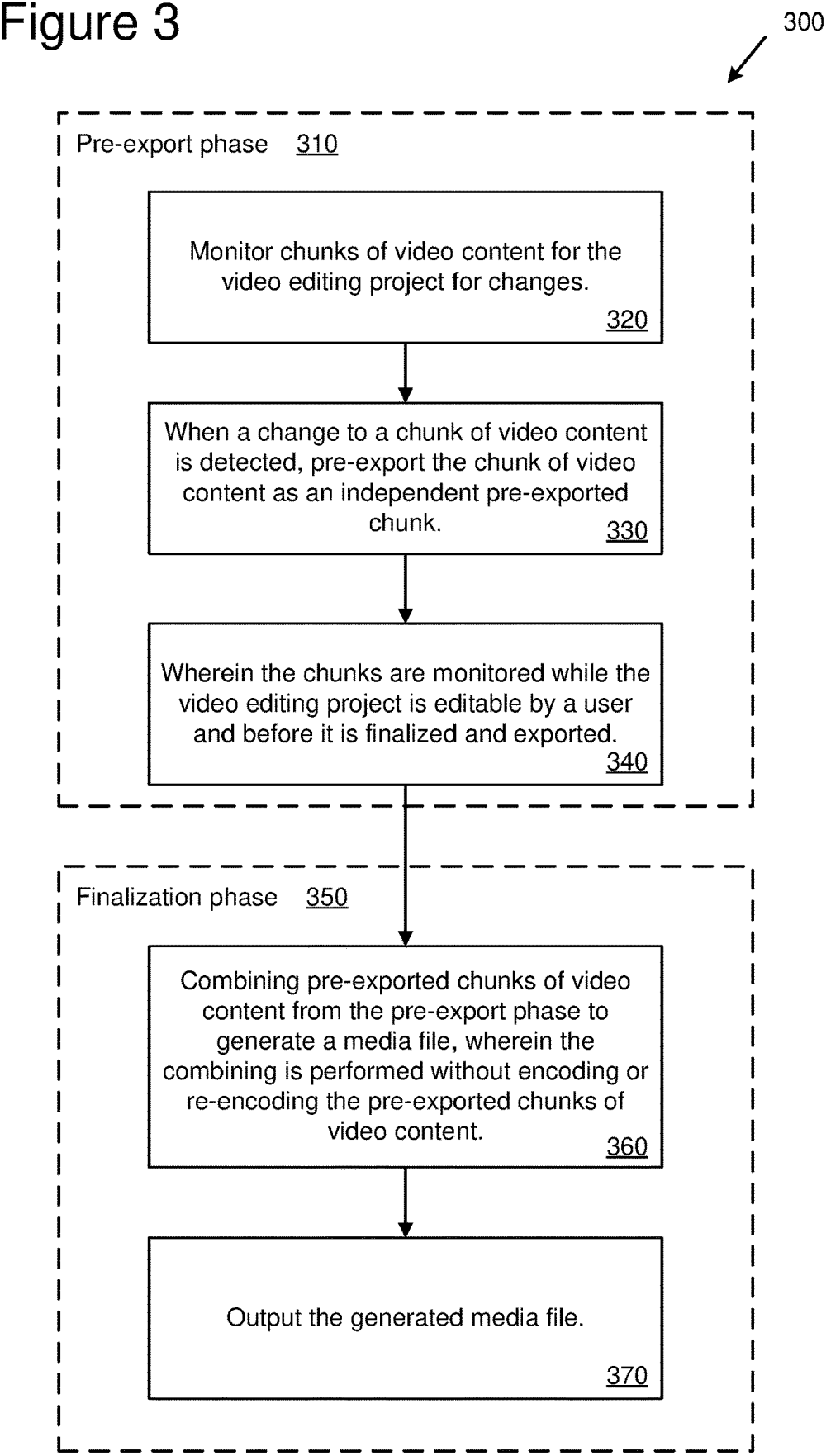
FIG. 3 is a flowchart of an example method for or pre-exporting chunks of video content during video editing of a video editing project, including a pre-export phase and a finalization phase.

FIG. 3 is a is a flowchart of an example method 300 for pre-exporting chunks of video content during video editing of a video editing project, including a pre-export phase 310 and a finalization phase 350. During the pre-export phase 310, chunks of video content for the video editing project are monitored for changes, as depicted at 320. For example, the monitoring can be performed on a continuous basis or a periodic basis. In some implementations, the monitoring is performed on a continuous basis by a background process. When a change to a chunk of video content is detected, the chunk of video content is pre-exported, as depicted at 330. The pre-exported chunk is encoded according to a video coding standard. The pre-exported chunk (e.g., as a chunk video file) is independent of other pre-exported chunks and can be combined with other pre-exported chunks without encoding or re-encoding the pre-exported chunks, as depicted at 340.

During the finalization phase 350, the pre-exported chunks of video content from the pre-export phase 310 are combined to generate a media file (e.g., a single media file), as depicted at 360. The combining is performed without encoding or re-encoding the pre-exported chunks of video content. Depending on the content of the video editing project, the media file can contain other audio and/or video content besides the pre-exported chunks of video content, such as audio tracks, subtitle content, etc. Once the media file is generated, it is output (e.g., stored on the computing device, streamed via a computer network, sent via an email or instant message, etc.), as depicted at 370.

Figure 4:
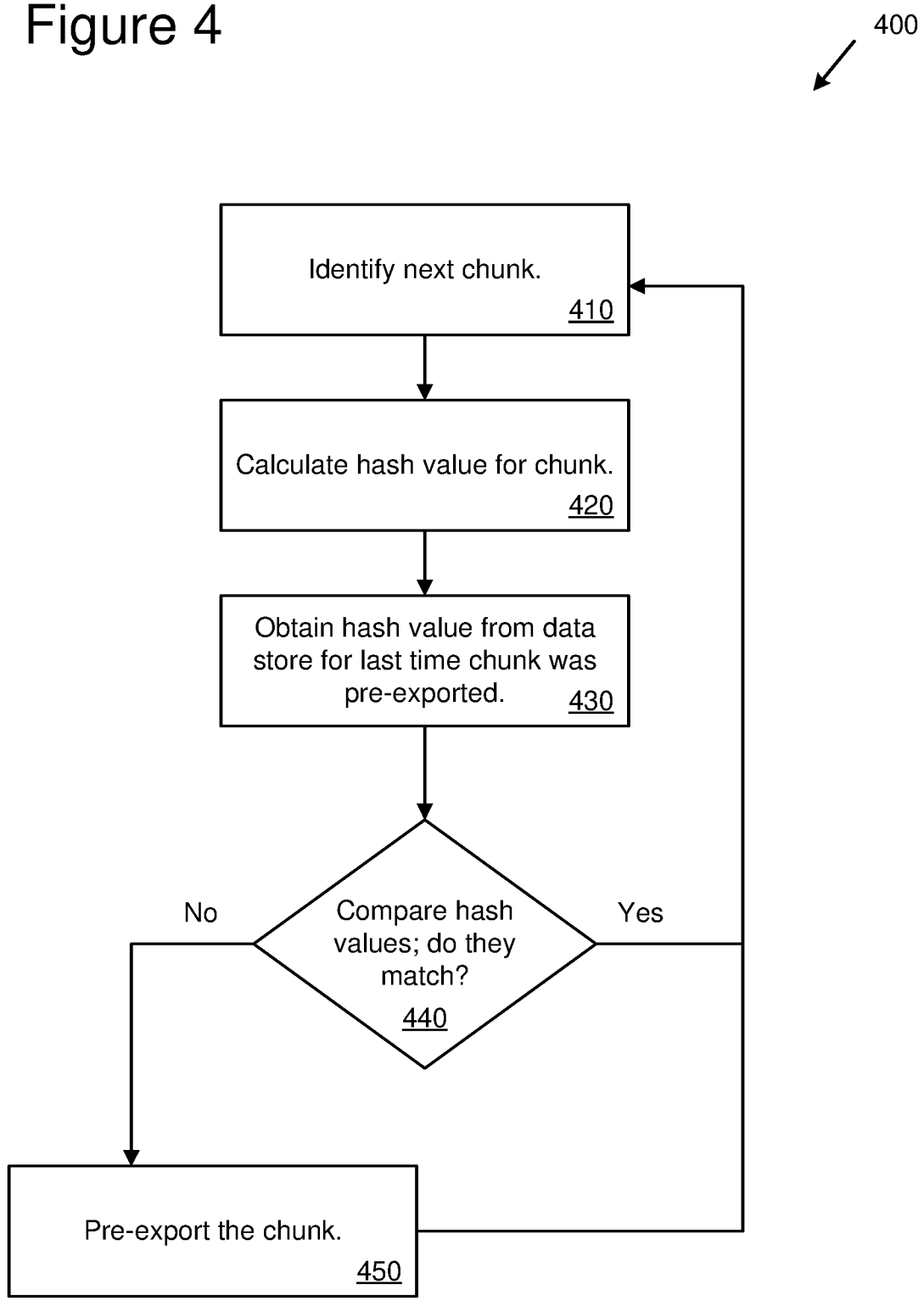
FIG. 4 is a flowchart of an example method for determining whether chunks of video content have changed since they were last pre-exported.

FIG. 4 is a is a flowchart of an example method 400 for determining whether chunks of video content have changed since they were last pre-exported. For example, the example method 400 can be performed by a process (e.g., a background process) that checks the chunks of the video editing project on a continual or periodic basis.

At 410, the next chunk is identified. For example, if the process is just starting, the next chunk is the first chunk (e.g., the first chunk of a sequence of chunks that make up the video editing process). If the process is continuing from a previous chunk, then the next chunk in the sequence can be identified. If the end of the sequence has been reached, then the process could stop or checking of the sequence of chunks can be restarted with the first chunk. The number of chunks is not fixed, and it can increase or decrease (e.g., when the video editing timeline is extended, then the number of chunks increases).

At 420, a hash value is created for the chunk that has been identified at 410. The hash value is created from the properties of the video editing elements associated with the chunk (e.g., the properties of all of the video editing elements associated with the chunk and any properties that affect the chunk).

At 430, a hash value is obtained from a data store (e.g., from a database) for the last time the chunk was pre-exported. At 440, the hash value for the chunk (calculated at 420) is compared to the obtained hash value for the last time the chunk was pre-exported (obtained at 430). If the hash values match (i.e., if the hash values are the same), then the chunk is not pre-exported (because there have been no changes since the last time it was pre-exported), and the method proceeds to 410.

However, if the hash values do not match, then the method proceeds to 450 and the chunk is pre-exported and the hash value that is stored in the data store for this chunk is updated to reflect the new hash value. The pre-exported chunk video file is then retained (e.g., by persistently storing it or keeping it in memory) After the chunk is pre-exported at 450, the method proceeds back to 410.

Example Features and Advantages

Various implementations of the technologies described herein for pre-exporting chunks of video content for a video editing project can use one or more of the following features separately or in combination.

According to a first feature, which is usable separately or in combination with any of the other features, the video editing process can be split into two phases: a pre-export phase that runs in parallel with, and does not block the video editing session, and a finalization phase that runs when the user wants to export a media file for the video editing project. The advantage of this approach is that the user can continue performing video editing operations during the pre-export phase. In some implementations, the finalization phase can run in the background and periodically produce a snapshot output video file that reflects the state of the video editing project at a specific point in time.

According to a second feature, which is usable separately or in combination with any of the other features, the video editing project is split (e.g., time wise) into adjacent intervals (referred to as chunks) covering the video editing project (e.g., the full duration of the video editing project). The chunks are individually and independently processed (e.g., checked for changes and pre-exported if needed) during the pre-export phase. One advantage to this approach is that pre-exporting of intervals can be performed efficiently (e.g., during idle time and/or in the background) while the video editing project remains editable and the user is still able to perform video editing operations. In addition, only those intervals that have changed need to be pre-exported.

According to a third feature, which is usable separately or in combination with any of the other features, the pre-exporting phase can run continuously in the background, selectively pre-exporting any chunks that have changed since they were last pre-exported. One advantage to this technique is that the pre-exported chunk video files can be maintained up-to-date without affecting the user's ability to use the video editing software, and when the user decides to finalize the video editing project, the pre-exported chunks can be efficiently combined without having to export the entire project.

According to a fourth feature, which is usable separately or in combination with any of the other features, the pre-exporting phase can generate the chunk video files as short media files (e.g., using the MPEG TS container format or another container format) that can be processed into a single, continuous media file in the finalization phase at low computational cost.

According to a fifth feature, which is usable separately or in combination with any of the other features, the finalization phase is very efficient and fast, and similar to merely saving a file instead of encoding the entire content of the video editing project. One advantage is that the time it takes to finalize the video editing project, compared to a traditional video editing solution, is much less.

According to a sixth feature, which is usable separately or in combination with any of the other features, detecting when a chunk of video content has changed since it was last pre-exported can be performed efficiently by comparing hash values generated from the properties associated with the chunks (e.g., comparing a first hash value generated from the properties of the chunk to a second hash value that was generated when the chunk was last pre-exported). An advantage to this approach is that the hash values can be generated from the properties without having to examine or process the video content itself. In addition, comparison of hash values can be performed efficiently using natively supported database operations.

According to a seventh feature, which is usable separately or in combination with any of the other features, the finalization phase can be run automatically in the background on a periodic basis to produce snapshots or versions of the video editing project. One advantage of this approach is the ability to access previous versions of the video editing project without having to manually finalize the video editing project on a periodic basis.

Additional Examples

Example 1 is a computing device comprising: a processor; a network interface; and memory; the computing device configured to perform operations for pre-exporting chunks of video content during video editing of a video editing project, the operations comprising: for each of a plurality of chunks of video content for the video editing project, wherein each chunk covers a different interval of a video editing timeline for the video editing project: determining whether the chunk of video content has changed since a last time the chunk of video content was pre-exported; and when the chunk of video content has changed, pre-exporting the chunk of video content; wherein the pre-exporting is performed while the video editing project is editable by a user and before the video editing project is finalized; and wherein the pre-exported chunk of video content is independent of other pre-exported chunks of video content for the video editing project and can be combined with the other pre-exported chunks of video content without encoding or re-encoding.

Example 2 includes the subject matter of Example 1, and further specifies that the determining and the pre-exporting are performed by continuously monitoring the plurality of chunks of video content for changes that occur during the video editing of the video editing project.

Example 3 includes the subject matter of any of Examples 1-2, and further specifies that a background process running on the computing device continuously monitors the plurality of chunks of video content for changes and performs the pre-exporting when a change is detected.

Example 4 includes the subject matter of any of Examples 1-3, and further specifies that the determining and the pre-exporting are performed without blocking video editing operations performed by the user during the video editing.

Example 5 includes the subject matter of any of Examples 1-4, and further specifies that the determining whether the chunk of video content has changed since a last time the chunk of video content was pre-exported comprises: comparing properties of the chunk of video content to properties associated with the last time the chunk of video content was pre-exported; and when the compared properties are different, determining that the chunk of video content has changed.

Example 6 includes the subject matter of any of Examples 1-4, and further specifies that the determining whether the chunk of video content has changed since a last time the chunk of video content was pre-exported comprises: computing a first hash value representing a current state of the chunk of video content; obtaining a second hash value representing a state of the chunk of video content the last time the chunk of video content was pre-exported; comparing the first hash value and the second hash value; and when the compared first and second hash values are different, determining that the chunk of video content has changed since the last time it was pre-exported.

Example 7 includes the subject matter of any of Examples 1-6, and further specifies that the pre-exporting the chunk of video content comprises: saving an indication of a current state of the chunk of video content; encoding the chunk of video content according to a video coding standard, including combining any media assets, effects, synthetic content, and other elements within an interval of the video editing timeline corresponding to the chunk of video content, to create a chunk video file; and storing the chunk video file containing the encoded chunk of video content.

Example 8 includes the subject matter of any of Examples 1-7, and further specifies that the operations further comprise: finalizing the video editing project, including: combining pre-exported chunks of video content to generate an encoded media file, wherein the combining is performed without encoding or re-encoding the pre-exported chunks of video content; and outputting the encoded media file.

Example 9 includes the subject matter of any of Examples 1-8, and further specifies that the operations further comprise: when the chunk of video content has not changed, skipping the pre-exporting the chunk of video content.

Example 10 is a method, implemented by a computing device, for pre-exporting chunks of video content during video editing of a video editing project, the method comprising: in a pre-export phase: monitoring each of a plurality of chunks of video content for the video editing project for changes, wherein each chunk covers a different interval of a video editing timeline for the video editing project; and when a change to a chunk of video content is detected, pre-exporting the chunk of video content, wherein the pre-exported chunk of video content is independent of other pre-exported chunks of video content for the video editing project; wherein the plurality of chunks of video content are monitored while the video editing project is editable by a user and before the video editing project is finalized and exported as a media file; in a finalization phase: combining pre-exported chunks of video content from the pre-export phase to generate, at least in part, a media file, wherein the combining is performed without encoding or re-encoding the pre-exported chunks of video content; and outputting the media file.

Example 11 includes the subject matter of Example 10, and further specifies that a background process running on the computing device monitors the plurality of chunks of video content for changes and performs the pre-exporting when a change is detected.

Example 12 includes the subject matter of any of Examples 10-11, and further specifies that the monitoring detects a change to a chunk by: comparing properties of the chunk of video content to properties associated with a last time the chunk of video content was pre-exported; and when the compared properties are different, determining that the chunk of video content has changed.

Example 13 includes the subject matter of any of Examples 10-11, and further specifies that the monitoring detects a change to a chunk by: computing a first hash value representing a current state of the chunk of video content; obtaining a second hash value representing a state of the chunk of video content at a last time the chunk of video content was pre-exported; comparing the first hash value and the second hash value; and when the compared first and second hash values are different, determining that the chunk of video content has changed since the last time it was pre-exported.

Example 14 includes the subject matter of any of Examples 10-13, and further specifies that the pre-exporting the chunk of video content comprises: saving an indication of a current state of the chunk of video content; encoding the chunk of video content according to a video coding standard, including combining any media assets, effects, synthetic content, and other elements within an interval of the video editing timeline corresponding to the chunk of video content, to create a chunk video file; and storing the chunk video file containing the encoded chunk of video content.

Example 15 is one or more computer-readable storage media storing computer-executable instructions for execution on a computing device to perform operations for pre-exporting chunks of video content during video editing of a video editing project, the operations comprising: in a pre-export phase: monitoring each of a plurality of chunks of video content for the video editing project for changes, wherein each chunk covers a different interval of a video editing timeline for the video editing project; and when a change to a chunk of video content is detected, pre-exporting the chunk of video content, wherein the pre-exported chunk of video content is independent of other pre-exported chunks of video content for the video editing project; wherein the plurality of chunks of video content are monitored while the video editing project is editable by a user and before the video editing project is finalized and exported as a media file; in a finalization phase: combining pre-exported chunks of video content from the pre-export phase to generate, at least in part, a media file, wherein the combining is performed without encoding or re-encoding the pre-exported chunks of video content; and outputting the media file.

Example 16 includes the subject matter of Example 15, and further specifies that a background process monitors the plurality of chunks of video content for changes and performs the pre-exporting when a change is detected.

Example 17 includes the subject matter of any of Examples 15-16, and further specifies that the monitoring detects a change to a chunk by: comparing properties of the chunk of video content to properties associated with a last time the chunk of video content was pre-exported; and when the compared properties are different, determining that the chunk of video content has changed.

Example 18 includes the subject matter of any of Examples 15-16, and further specifies that the monitoring detects a change to a chunk by: computing a first hash value representing a current state of the chunk of video content; obtaining a second hash value representing a state of the chunk of video content at a last time the chunk of video content was pre-exported; comparing the first hash value and the second hash value; and when the compared first and second hash values are different, determining that the chunk of video content has changed since the last time it was pre-exported.

Example 19 includes the subject matter of any of Examples 15-18, and further specifies that the pre-exporting the chunk of video content comprises: saving an indication of a current state of the chunk of video content; encoding the chunk of video content according to a video coding standard, including combining any media assets, effects, synthetic content, and other elements within an interval of the video editing timeline corresponding to the chunk of video content, to create a chunk video file; and storing the chunk video file containing the encoded chunk of video content.

Example 20 includes the subject matter of any of Examples 1-19, and further specifies that the video editing project runs within a browser-based video editing application.

Computing Systems

Figure 5:
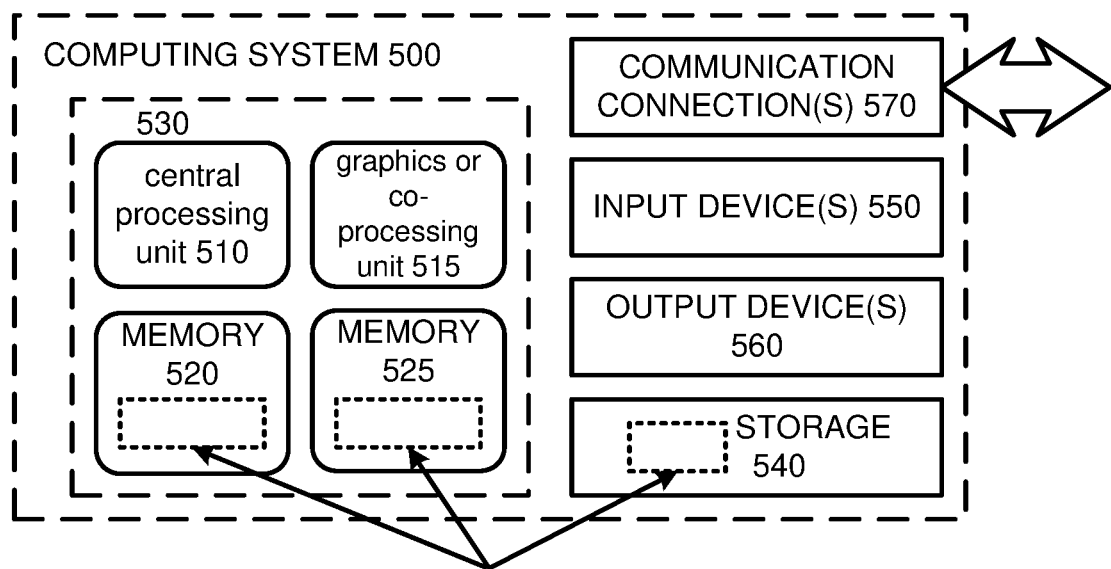
FIG. 5 is a diagram of an example computing system in which some described embodiments can be implemented.

FIG. 5 depicts a generalized example of a suitable computing system 500 in which the described technologies may be implemented. The computing system 500 is not intended to suggest any limitation as to scope of use or functionality, as the technologies may be implemented in diverse general-purpose or special-purpose computing systems.

With reference to FIG. 5, the computing system 500 includes one or more processing units 510, 515 and memory 520, 525. In FIG. 5, this basic configuration 530 is included within a dashed line. The processing units 510, 515 execute computer-executable instructions. A processing unit can be a general-purpose central processing unit (CPU), processor in an application-specific integrated circuit (ASIC), or any other type of processor. A processing unit can also comprise multiple processors. In a multi-processing system, multiple processing units execute computer-executable instructions to increase processing power. For example, FIG. 5 shows a central processing unit 510 as well as a graphics processing unit or co-processing unit 515. The tangible memory 520, 525 may be volatile memory (e.g., registers, cache, RAM), non-volatile memory (e.g., ROM, EEPROM, flash memory, etc.), or some combination of the two, accessible by the processing unit(s). The memory 520, 525 stores software 580 implementing one or more technologies described herein, in the form of computer-executable instructions suitable for execution by the processing unit(s).

A computing system may have additional features. For example, the computing system 500 includes storage 540, one or more input devices 550, one or more output devices 560, and one or more communication connections 570. An interconnection mechanism (not shown) such as a bus, controller, or network interconnects the components of the computing system 500. Typically, operating system software (not shown) provides an operating environment for other software executing in the computing system 500, and coordinates activities of the components of the computing system 500.

The tangible storage 540 may be removable or non-removable, and includes magnetic disks, magnetic tapes or cassettes, CD-ROMs, DVDs, or any other medium which can be used to store information and which can be accessed within the computing system 500. The storage 540 stores instructions for the software 580 implementing one or more technologies described herein.

The input device(s) 550 may be a touch input device such as a keyboard, mouse, pen, or trackball, a voice input device, a scanning device, or another device that provides input to the computing system 500. For video encoding, the input device(s) 550 may be a camera, video card, TV tuner card, or similar device that accepts video input in analog or digital form, or a CD-ROM or CD-RW that reads video samples into the computing system 500. The output device(s) 560 may be a display, printer, speaker, CD-writer, or another device that provides output from the computing system 500.

The communication connection(s) 570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The technologies can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud-Supported Environment

Figure 6:
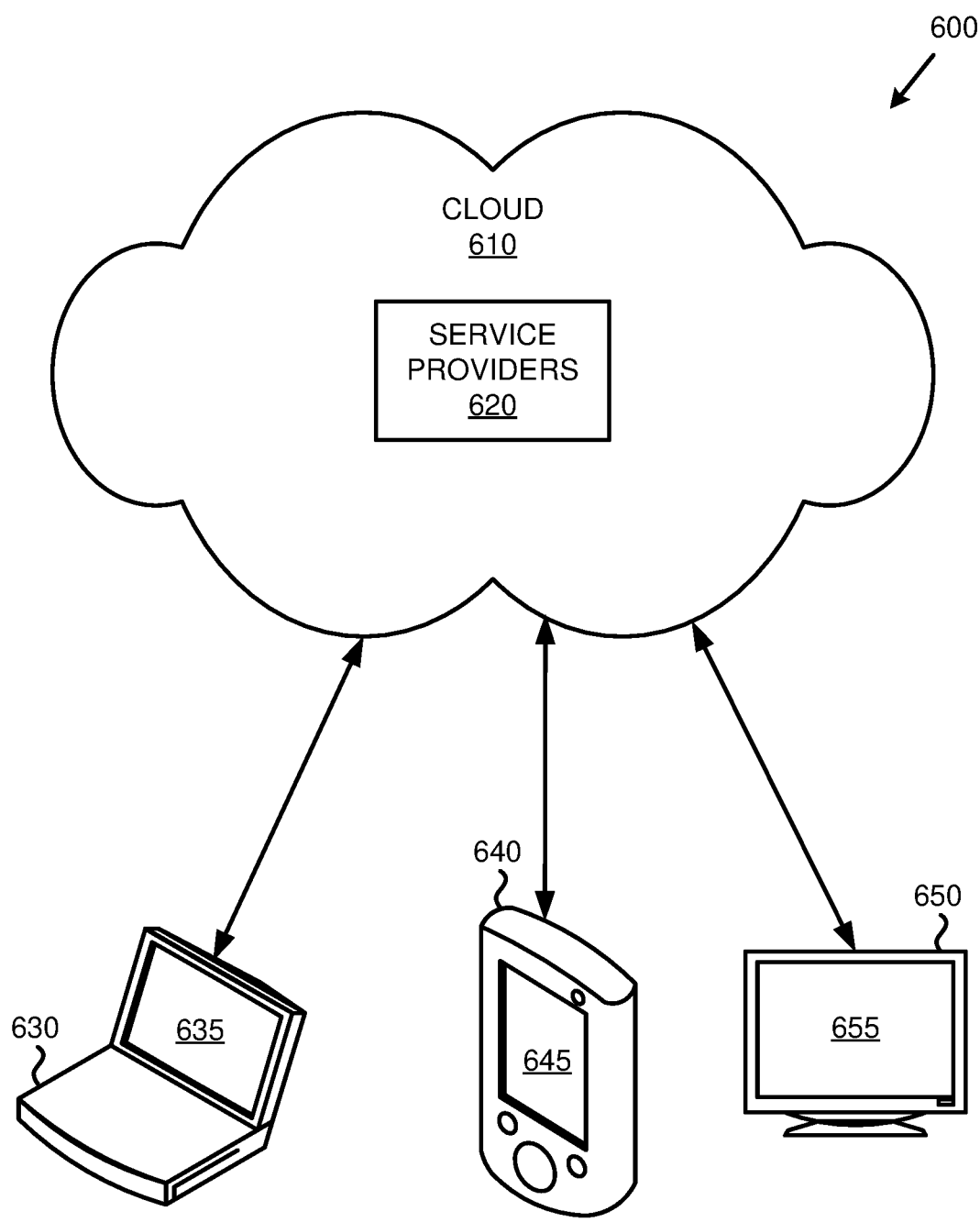
FIG. 6 is an example cloud-support environment that can be used in conjunction with the technologies described herein.

FIG. 6 illustrates a generalized example of a suitable cloud-supported environment 600 in which described embodiments, techniques, and technologies may be implemented. In the example environment 600, various types of services (e.g., computing services) are provided by a cloud 610. For example, the cloud 610 can comprise a collection of computing devices, which may be located centrally or distributed, that provide cloud-based services to various types of users and devices connected via a network such as the Internet. The implementation environment 600 can be used in different ways to accomplish computing tasks. For example, some tasks (e.g., processing user input and presenting a user interface) can be performed on local computing devices (e.g., connected devices 630, 640, 650) while other tasks (e.g., storage of data to be used in subsequent processing) can be performed in the cloud 610.

In example environment 600, the cloud 610 provides services for connected devices 630, 640, 650 with a variety of screen capabilities. Connected device 630 represents a device with a computer screen 635 (e.g., a mid-size screen). For example, connected device 630 could be a personal computer such as desktop computer, laptop, notebook, netbook, or the like. Connected device 640 represents a device with a mobile device screen 645 (e.g., a small size screen). For example, connected device 640 could be a mobile phone, smart phone, personal digital assistant, tablet computer, and the like. Connected device 650 represents a device with a large screen 655. For example, connected device 650 could be a television screen (e.g., a smart television) or another device connected to a television (e.g., a set-top box or gaming console) or the like. One or more of the connected devices 630, 640, 650 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 600. For example, the cloud 610 can provide services for one or more computers (e.g., server computers) without displays.

Services can be provided by the cloud 610 through service providers 620, or through other providers of online services (not depicted). For example, cloud services can be customized to the screen size, display capability, and/or touchscreen capability of a particular connected device (e.g., connected devices 630, 640, 650).

In example environment 600, the cloud 610 provides the technologies and solutions described herein to the various connected devices 630, 640, 650 using, at least in part, the service providers 620. For example, the service providers 620 can provide a centralized solution for various cloud-based services. The service providers 620 can manage service subscriptions for users and/or devices (e.g., for the connected devices 630, 640, 650 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 5, computer-readable storage media include memory 520 and 525, and storage 540. The term computer-readable storage media does not include signals and carrier waves. In addition, the term computer-readable storage media does not include communication connections, such as 570.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computing device comprising:
 a processor;
 a network interface; and
 memory;
 the computing device configured to perform operations for pre-exporting chunks of video content during video editing of a video editing project, the operations comprising:
  for each of a plurality of chunks of video content for the video editing project, wherein each chunk covers a different interval of a video editing timeline for the video editing project:
   determining whether the chunk of video content has changed since a last time the chunk of video content was pre-exported; and
   when the chunk of video content has changed, pre-exporting the chunk of video content, comprising:
    encoding the pre-exported chunk of video content according to a video coding standard to create a chunk video file that is encoded independently from other chunk video files for the video editing project; and
    storing the chunk video file;
   wherein the pre-exporting is performed while the video editing project is editable by a user and before the video editing project is finalized; and
  finalizing the video editing project, comprising:
   combining the pre-exported chunks of video content for the video editing project to generate an encoded media file; and
   outputting the encoded media file.

2. The computing device of claim 1, wherein the determining and the pre-exporting are performed by continuously monitoring the plurality of chunks of video content for changes that occur during the video editing of the video editing project.

3. The computing device of claim 1, wherein the determining whether the chunk of video content has changed since a last time the chunk of video content was pre-exported comprises:
 comparing properties of the chunk of video content to properties associated with the last time the chunk of video content was pre-exported; and
 when the compared properties are different, determining that the chunk of video content has changed.

4. The computing device of claim 1, wherein the determining whether the chunk of video content has changed since a last time the chunk of video content was pre-exported comprises:
 computing a first hash value representing a current state of the chunk of video content;
 obtaining a second hash value representing a state of the chunk of video content the last time the chunk of video content was pre-exported;
 comparing the first hash value and the second hash value; and
 when the compared first and second hash values are different, determining that the chunk of video content has changed since the last time it was pre-exported.

5. The computing device of claim 1, wherein the encoding the pre-exported chunk of video content according to a video coding standard comprises combining any media assets, effects, synthetic content, and other elements within an interval of the video editing timeline corresponding to the chunk of video content, to create the chunk video file.

6. The computing device of claim 1, wherein the combining is performed without encoding or re-encoding the pre-exported chunks of video content by concatenating the pre-exported chunks of video content on a file level.

7. The computing device of claim 1, the operations further comprising:
when the chunk of video content has not changed, skipping the pre-exporting the chunk of video content.

8. The computing device of claim 1, wherein the video editing project runs within a browser-based video editing application.

9. The computing device of claim 1, the operations further comprising:
receiving an indication that the user has edited the video editing project; and
responsive to receiving the indication, triggering the determining and the pre-exporting.

10. A method, implemented by a computing device, for pre-exporting chunks of video content during video editing of a video editing project, the method comprising:
in a pre-export phase, for each of a plurality of chunks of video content for the video editing project, wherein each chunk covers a different interval of a video editing timeline for the video editing project:
determining whether the chunk of video content has changed since a last time the chunk of video content was pre-exported; and
when the chunk of video content has changed, pre-exporting the chunk of video content, comprising:
encoding the pre-exported chunk of video content according to a video coding standard to create a chunk video file that is encoded independently from other chunk video files for the video editing project; and
storing the chunk video file;
wherein the pre-exporting is performed while the video editing project is editable by a user and before the video editing project is finalized;
in a finalization phase:
combining the pre-exported chunks of video content for the video editing project to generate an encoded media file; and
outputting the encoded media file.

11. The method of claim 10, wherein the determining and the pre-exporting are performed by continuously monitoring the plurality of chunks of video content for changes that occur during the video editing of the video editing project.

12. The method of claim 10, wherein the determining whether the chunk of video content has changed since a last time the chunk of video content was pre-exported comprises:
comparing properties of the chunk of video content to properties associated with the last time the chunk of video content was pre-exported; and
when the compared properties are different, determining that the chunk of video content has changed.

13. The method of claim 10, wherein the encoding the pre-exported chunk of video content according to a video coding standard comprises combining any media assets, effects, synthetic content, and other elements within an interval of the video editing timeline corresponding to the chunk of video content, to create the chunk video file.

14. The method of claim 10, wherein the combining is performed without encoding or re-encoding the pre-exported chunks of video content by concatenating the pre-exported chunks of video content on a file level.

15. The method of claim 10, further comprising:
receiving an indication that the user has edited the video editing project; and
responsive to receiving the indication, triggering the determining and the pre-exporting.

16. One or more computer-readable storage media storing computer-executable instructions for execution on a computing device to perform operations for pre-exporting chunks of video content during video editing of a video editing project, the operations comprising:
in a pre-export phase, for each of a plurality of chunks of video content for the video editing project, wherein each chunk covers a different interval of a video editing timeline for the video editing project:
determining whether the chunk of video content has changed since a last time the chunk of video content was pre-exported; and
when the chunk of video content has changed, pre-exporting the chunk of video content, comprising:
encoding the pre-exported chunk of video content according to a video coding standard to create a chunk video file that is encoded independently from other chunk video files for the video editing project; and
storing the chunk video file;
wherein the pre-exporting is performed while the video editing project is editable by a user and before the video editing project is finalized;
in a finalization phase:
combining the pre-exported chunks of video content for the video editing project to generate an encoded media file; and
outputting the encoded media file.

17. The one or more computer-readable storage media of claim of claim 16, wherein the determining and the pre-exporting are performed by continuously monitoring the plurality of chunks of video content for changes that occur during the video editing of the video editing project.

18. The one or more computer-readable storage media of claim of claim 16, wherein the determining whether the chunk of video content has changed since a last time the chunk of video content was pre-exported comprises:
comparing properties of the chunk of video content to properties associated with the last time the chunk of video content was pre-exported; and
when the compared properties are different, determining that the chunk of video content has changed.

19. The one or more computer-readable storage media of claim of claim 16, wherein the combining is performed without encoding or re-encoding the pre-exported chunks of video content by concatenating the pre-exported chunks of video content on a file level.

20. The one or more computer-readable storage media of claim of claim 16, the operations further comprising:
receiving an indication that the user has edited the video editing project; and
responsive to receiving the indication, triggering the determining and the pre-exporting.

* * * * *